United States Patent [19]
Abbondanzio et al.

[11] Patent Number: 5,890,011
[45] Date of Patent: Mar. 30, 1999

[54] METHOD AND SYSTEM FOR DYNAMICALLY TRANSLATING BUS ADDRESSES WITHIN A COMPUTER SYSTEM

[75] Inventors: Antonio Abbondanzio, Austin, Tex.; Bradley Paul Anderson, Delray Beach, Fla.; Ronald Patrick Doyle, Raleigh, N.C.; Kenneth Alan Rowland, Lake Worth, Fla.; Sandra Juni Schlosser, Austin; Joel Leslie Smith, Round Rock, both of Tex.

[73] Assignee: International Business Machines Corporation, Armonk, N.Y.

[21] Appl. No.: 791,491

[22] Filed: Jan. 27, 1997

[51] Int. Cl.[6] .................................................. G06F 13/00
[52] U.S. Cl. ........................ 395/829; 395/836; 395/308; 395/306; 395/828; 395/830
[58] Field of Search ..................................... 395/306–309, 395/287, 289, 828–830, 836–838, 847, 726–727

[56] References Cited

U.S. PATENT DOCUMENTS

| | | | |
|---|---|---|---|
| 4,473,878 | 9/1984 | Zolnowsky et al. | 364/200 |
| 4,488,256 | 12/1984 | Zolnowsky et al. | 364/900 |
| 5,339,397 | 8/1994 | Eikill et al. | 395/400 |
| 5,379,394 | 1/1995 | Goto | 395/425 |
| 5,404,478 | 4/1995 | Arai et al. | 395/400 |
| 5,442,766 | 8/1995 | Chu et al. | 395/414 |
| 5,522,050 | 5/1996 | Amini et al. | 395/306 |
| 5,542,055 | 7/1996 | Amini et al. | 395/281 |
| 5,659,696 | 8/1997 | Amini et al. | 711/202 |
| 5,668,949 | 9/1997 | Nardone et al. | 395/200.31 |
| 5,687,327 | 11/1997 | Arimilli et al. | 395/287 |
| 5,761,448 | 6/1998 | Adamson et al. | 395/284 |
| 5,761,462 | 6/1998 | Neal et al. | 395/309 |
| 5,778,197 | 7/1998 | Dunham | 395/284 |

OTHER PUBLICATIONS

IBM Technical Disclosure Bulletin, vol. 38, No. 01, Jan. 1995, "Exporting a Subset of Virtual Address Bits for L2 Support".

Primary Examiner—Ayaz R. Sheikh
Assistant Examiner—Raymond N Phan
Attorney, Agent, or Firm—Richard A. Henkler; Antony P. Ng; Andrew J. Dillon

[57] ABSTRACT

A method for dynamically translating bus address within a computer system is disclosed. In accordance with the method and system of the present invention, a computer system has a multiple of buses connected in a hierarchial manner. Information concerning a bus and a device attached to a bus are stored in a Hardware Namespace. In response to a request for an access to a device attached to one of the buses for the first time, a determination is made from the Hardware Namespace as to whether or not there is resource available for the device in a parent bus of the device. If there is resource available in the parent bus for the device, another determination is made from the Hardware Namespace as to whether or not the resource is exclusively allocated in the parent bus for the device. If the resource is exclusively allocated in the parent bus for the device, the device is configured according to the available resource. If the resource is not exclusively allocated in the parent bus for the device, the process resolves through each level of buses in the hierarchy until a bus having a resource that can be allocated for the device is found such that the device can be added to any one of the buses within the computer system independent of bus technology.

9 Claims, 4 Drawing Sheets

METHOD AND SYSTEM FOR DYNAMICALLY TRANSLATING BUS ADDRESSES WITHIN A COMPUTER SYSTEM

CROSS-REFERENCE TO A RELATED PATENT APPLICATION

The present invention is related to the subject matter of a co-pending United States Patent Application entitled ""Sticky" Logical drive letter assignment," filed November 1, 1996, Ser. No. 08/742,535 (IBM Docket No. BC9-96-015), and assigned to the assignee herein named. The content of the above-mentioned co-pending patent application is incorporated by reference herein.

BACKGROUND OF THE INVENTION

1. Technical Field

The present invention relates to a method and system for data processing, in general, and in particular, to a method and system for processing bus information within a computer system. Still more particularly, the present invention relates to a method and system for dynamically translating bus addresses within a computer system.

2. Description of the Prior Art

A computer system or data-processing system typically includes several types of buses, such as system bus, local buses, and peripheral buses. Various electronic-circuit devices and components are interconnected with each other via these buses such that intercommunication may be possible among all of the devices that are attached to one of the buses mentioned above. In general, a central processing unit (CPU) is attached to a system bus and over which the CPU communicates directly with a system memory that is also attached to the system bus.

A local bus such as Peripheral Component Interconnect (PCI) bus, is intended for connecting certain highly integrated peripheral components on the same bus as the CPU. Under the PCI local bus standard, peripheral components can directly connect to a PCI local bus without the need for glue logic. Thus, the PCI provides a bus standard on which high-performance peripheral devices, such as graphics devices and hard disk drives, can be coupled to the CPU, thereby permitting these high-performance peripheral devices to avoid the general access latency and the bandwidth constraints that would have occurred if these peripheral devices were connected to a peripheral bus.

A peripheral bus such as an Industry Standard Architecture (ISA) bus or an Extended Industry Standard Architecture (EISA) bus, is utilized for connecting various peripheral devices to the computer system. These peripheral devices typically include input/output (I/O) devices such as keyboard, floppy drives, and display monitor. A bus-to-bus bridge chip is commonly provided between a peripheral bus and a local bus in order to provide communication between devices that are attached to these two buses. A computer system can have other types of peripheral buses instead of, or in addition to, the two types of buses mentioned above. These include VM bus, XME bus, etc. Numerous types of peripheral devices are also available for usage with these various bus architectures.

In general, each bus in a computer system owns system resources such as I/O address space or memory address space that can be mapped into its parent bus address space. For example, in the PowerPC™ (PowerPC is a trademark of International Business Machines Corporation) platform, an ISA bus has an address range of 0–64 K that can be mapped to anywhere within a PCI local bus (ISA bus' parent bus) having an address range of 0–1 G. In turn, the address range 0–1 G of the PCI local bus can be mapped to anywhere within a system bus (PCI bus' parent bus) having an address range 0–2 G. Furthermore, the address range 0–2 G of the system bus can also be translated to a system physical address range of 1–3 G. Hence, a mouse device, utilizing an I/O port address of, for example, $0 \times 60_{hex}$, may be mapped and translated anywhere in the 1–3 G range of the system physical address.

Under prior art, the bus address arrangement of a computer system is determined during the system initiation and cannot be changed during runtime. Hence, although all the devices within the computer system may be free of conflict in the beginning, this statically configured computer system cannot anticipate and provide a resource conflict resolution between the mouse device as mentioned above and, for example, a hot-pluggable peripheral device which utilizes the same I/O port address as the mouse device (i.e., $0-60_{hex}$) that may be installed in the computer system during runtime. Consequently, it would be desirable to provide a method for dynamically translating bus address during runtime in order to furnish a conflict-free resource for each device within a computer system.

SUMMARY OF THE INVENTION

In view of the foregoing, it is therefore an object of the present invention to provide an improved method and system for data processing.

It is another object of the present invention to provide an improved method and system for processing bus information within a computer system.

It is yet another object of the present invention to provide an improved method and system for dynamically translating bus addresses within a computer system.

In accordance with the method and system of the present invention, a computer system has a multiple of buses connected in a hierarchial manner. Information concerning each bus and each device attached to a bus are stored in a Hardware Namespace. In response to a request for an access to a device attached to one of the buses for the first time, a determination is made from the Hardware Namespace as to whether or not there is resource available for the device in a parent bus of the device. If there is resource available in the parent bus for the device, another determination is made from the Hardware Namespace as to whether or not the resource is exclusively allocated in the parent bus for the device. If the resource is exclusively allocated in the parent bus for the device, the device is configured according to the available resource. If the resource is not exclusively allocated in the parent bus for the device, the process resolves through each level of buses in the hierarchy until a bus having a resource that can be allocated for the device is found such that the device can be added to any one of the buses within the computer system independent of bus technology.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

The present invention may be executed in a variety of computers under a number of different operating systems. The computer may be, for example, a personal computer, a mini-computer, or a mainframe computer. In addition, the computer may be a stand-alone system or part of a network such as a local-area network (LAN) or a wide-area network (WAN). For the purpose of illustration, a preferred embodiment of the present invention, as described below, is implemented on the Aptiva™ series personal computer having an O/S 2 Warp operating system, both manufactured by International Business Machines Corporation.

Figure 1:
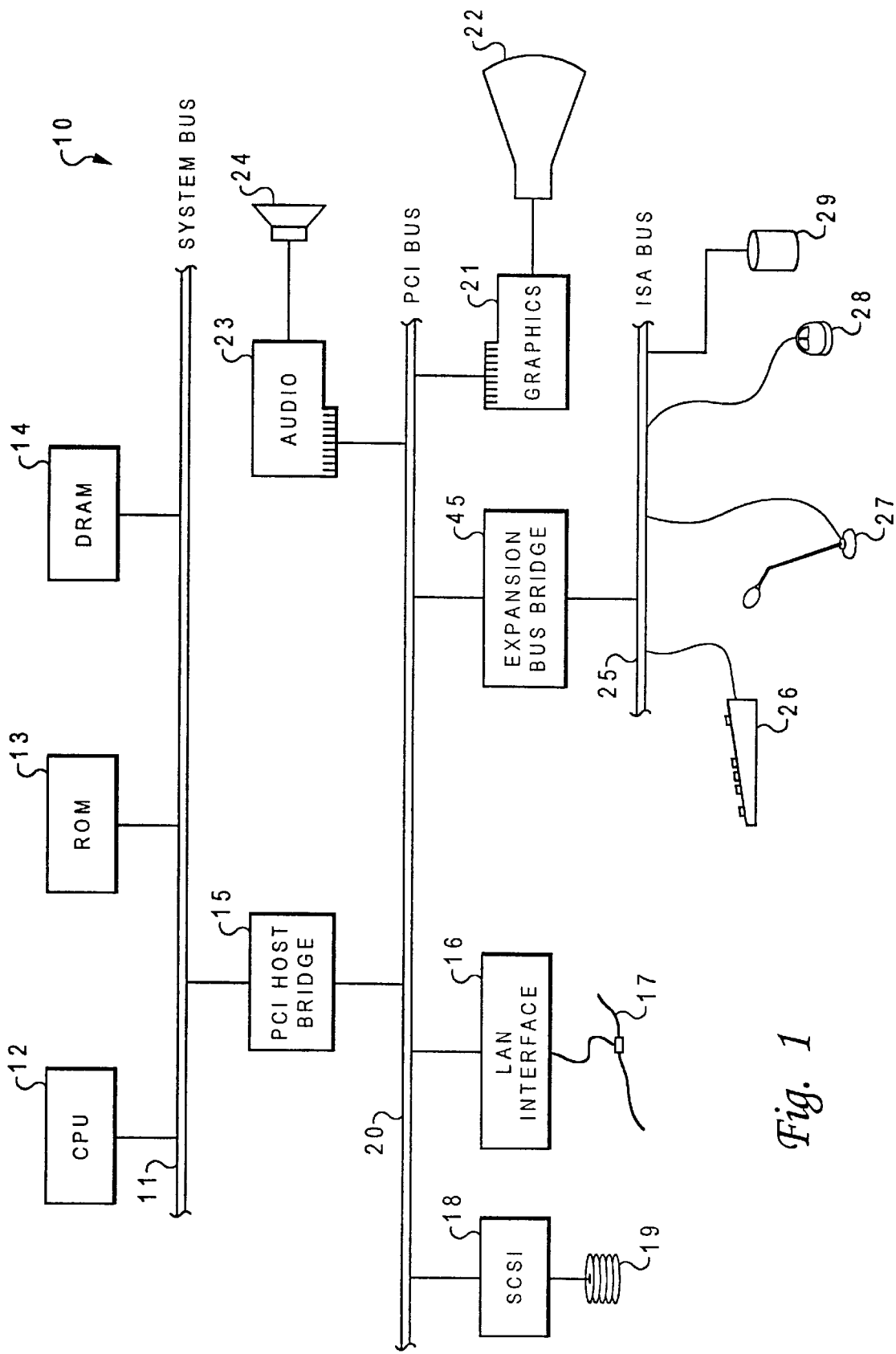
FIG. 1 is a block diagram of a typical computer system having multiple bus architecture, which may utilize a preferred embodiment of the present invention.

Referring now to the drawings and in particular to FIG. 1, there is depicted a block diagram of a typical computer system having multiple bus architecture, which may utilize a preferred embodiment of the present invention. As shown, a central processing unit (CPU) 12, a read-only memory (ROM) 13, and a Dynamic Random Access Memory (DRAM) 14 are connected to a system bus 11 of a computer system 10. CPU 12, ROM 13, and DRAM 14 are also coupled to a PCI local bus 20 of computer system 10 through a PCI host bridge 15. PCI host bridge 15 provides a low latency path through which processor 12 may directly access PCI devices mapped anywhere within bus memory and/or I/O address spaces. PCI host bridge 15 also provides a high bandwidth path for allowing PCI devices to directly access DRAM 14.

Also attaching to PCI local bus 20 are LAN interface 16, small computer system interface (SCSI) 18, and expansion bus bridge 45. LAN interface 16 is for connecting computer system 10 to a local-area network 17. SCSI 18 is utilized to control high-speed SCSI disk drive 19. Expansion bus bridge 45, such as a PCI-to-ISA bus bridge, may be utilized for coupling ISA bus 25 to PCI local bus 20. As shown, a keyboard 26, a microphone 27, and a mouse 28 are attached to ISA bus 25 for performing certain basic I/0 functions. In addition, an audio adapter 23 is attached to PCI local bus 20 for controlling audio output through speaker 24. A graphics adapter 21 is also attached to PCI local bus 20 for controlling visual output through display monitor 22.

Although the illustrated exemplary embodiment describes a system bus 11, a PCI local bus 20, and an ISA bus 25, the present invention is not limited to these particular bus architectures. Rather, the present invention can be utilized in any multi-bus system having other different bus architectures.

A bus manager is a device driver that provides a set of services utilized to detect, query, translate, and configure a hardware device that is attached to a bus dynamically. Bus managers understand the specific hardware details required to perform these services but abstract these details away from their clients by supporting common, hardware-independent bus management and driver-support services. This allows device drivers to port across different hardware platforms because all platform specific operations are handled by these bus managers. The clients of a bus manager comprises a Hardware Resource Manager (HRM) of the operating system and various device drivers. Bus managers are responsible for providing information such as bus configuration and device configuration to the HRM. The HRM then stores all the bus configuration information and devices configuration information in a hierarchical tree called Hardware Namespace (or Hardware Tree).

The process of detecting the presence of hardware devices and the subsequent addition of entries related to these hardware device to the Hardware Namespace is called enumeration. For example, a system bus manager enumerates each hardware device, including any host bridge, on a system bus. When the system bus manager enumerates a hardware device, it adds an entry to the Hardware Namespace. Similarly, when the system bus manager enumerates a host bridge, it adds another entry to the Hardware Namespace. After an entry for a host bridge has been added to the Hardware Namespace, an appropriate bus manager extension(s) will subsequently be loaded for opening any expansion bus that is coupled to the host bridge. The newly loaded bus manager extension will then enumerate each hardware device on its bus, and again, each hardware device found on the bus is added as an entry to the Hardware Namespace. This cycle of enumerating a bus, discovering a bus bridge, loading and opening a new bus manager, and then instructing the new bus manager to enumerate each hardware device attached to the new bus is how all the hardware devices are discovered in a computer system having multiple bus architecture.

Figure 2:
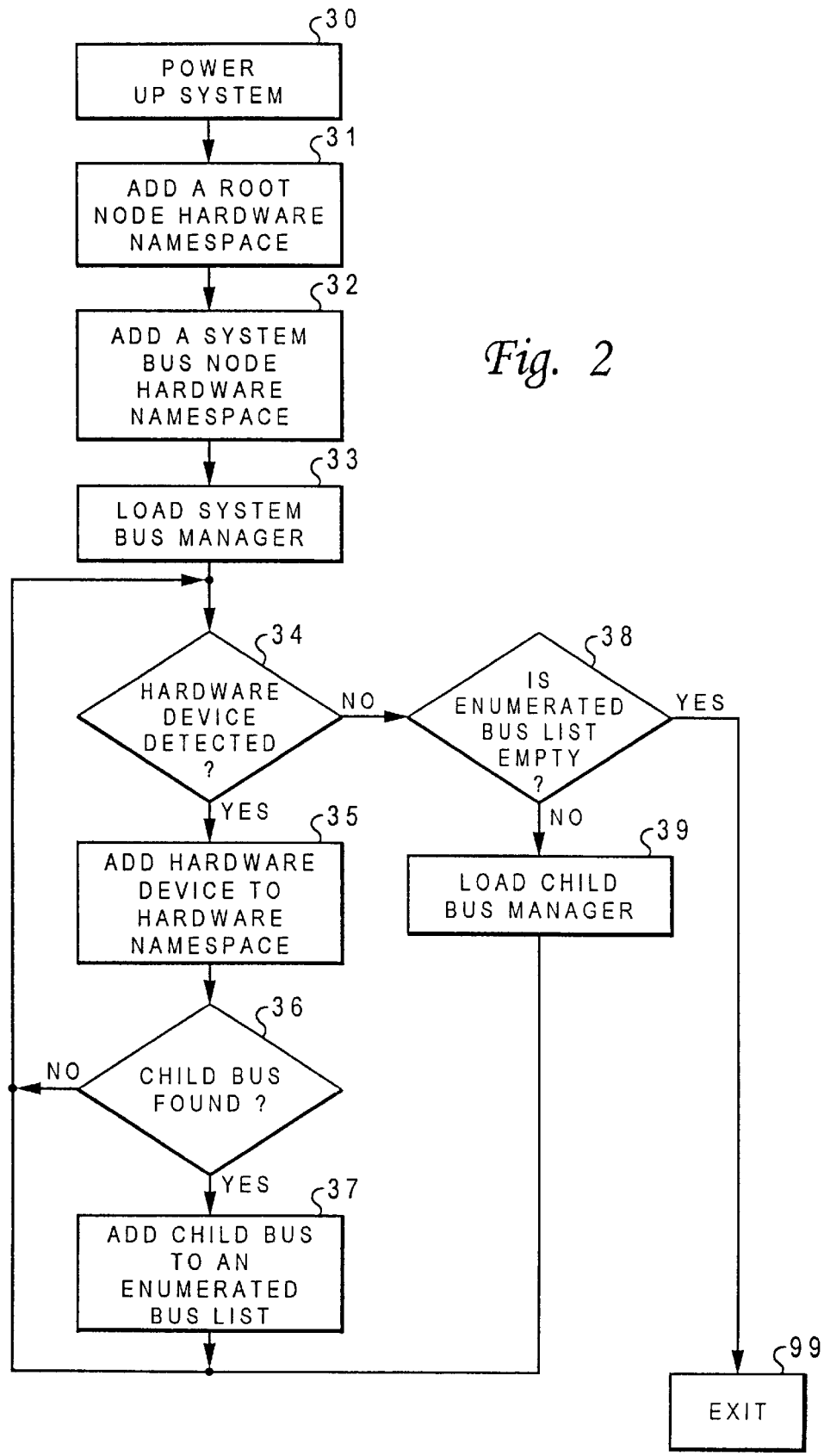
FIG. 2 is a high-level logic flow diagram of an enumeration process within a computer system, according to a preferred embodiment of the present invention.

With reference now to FIG. 2, there is illustrated a high-level logic flow diagram of an enumeration process within a computer system, according to a preferred embodiment of the present invention. The computer system is first turned on, as shown in block 30, and a root node is added to a Hardware Namespace, as depicted in block 31. A system bus node is also added to the Hardware Namespace, as illustrated in block 32. After a system bus manager is loaded, as shown in block 33, a determination is made as to whether or not a hardware device is detected on the system bus, as depicted in block 34. If a hardware device is detected on the system bus, the hardware device is added to the Hardware Namespace, as illustrated in block 35. Subsequently, another determination is made as to whether or not a child bus is found on the system bus, as shown in block 36. If there is no child bus found on the system bus, the process returns to block 34. Otherwise, if there is a child bus found on the system bus, the child bus is added to an Enumerated Bus List, as depicted in block 37, before the process returns to block 34.

After all hardware devices have been detected on the system bus, a determination is made as to whether or not the Enumerate Bus List is empty, as shown in block 38. If the Enumerated Bus List is not empty, a child bus manager is loaded, as shown in block 39. The process then returns to block 34. Otherwise, if the Enumerated Bus List is empty, indicating that there is no child bus attached, the process exits at block 99.

Figure 3:
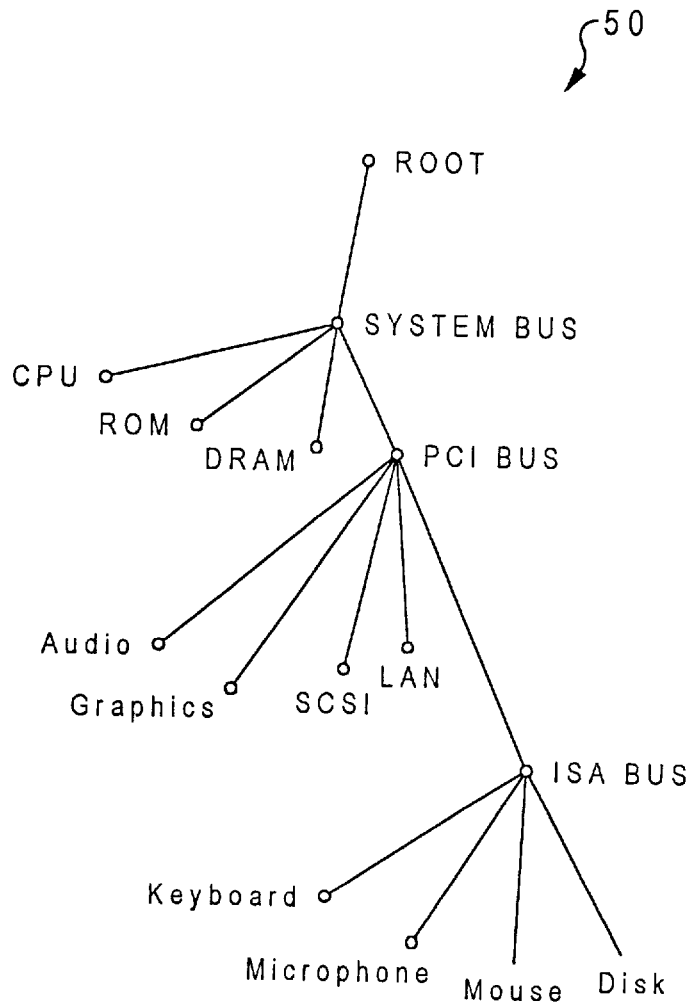
FIG. 3 is a graphical illustration of a Hardware Namespace example in accordance with a preferred embodiment of the present invention.

Referring now to FIG. 3, there is depicted a graphical illustration of a Hardware Namespace example in accordance with a preferred embodiment of the present invention. Hardware Namespace 50 is constructed for the computer system of FIG. 1 by utilizing the enumeration process as described in FIG. 2. As shown, each node in Hardware Namespace 50 corresponds to each bus and hardware device of computer system 10. Under the present invention, a device is broadly defined to include a bus (bridge) or a hardware device.

As a preferred embodiment, there are three types of bus arrangements that may be utilized within a computer system. Accordingly, there are also three types of bus managers that are known to the HRM. The first type of bus arrangement is called a non-mapped bus. For a non-mapped bus, the address of a child bus is the same as that of its parent. Hence, the HRM does not need to consider address mapping when computing conflict-free resource.

The second type of bus arrangement is called a pre-mapped bus. For a pre-mapped bus, the firmware (e.g., system BIOS) will map the address range of a child bus to the address range of its parent bus during system initiation time. In essence, the address range of the child bus may be mapped to any of the noncontiguous address ranges of its parent bus. For a pre-mapped bus, each bus manager may provide the HRM a service of translating its bus address to the bus address of its parent bus. The HRM may also check the request resource is available in the parent bus address by calling the parent bus manager recursively until the address is translated to the system physical address. For example, an ISA bus manager translated an I/O port address of a device to PCI bus address, then the PCI bus manager translates it again to a system bus address, and finally, the system bus manager translates it into the system physical address. By so doing, significant memory could be utilized if the HRM is required to track this address mapping.

The third type of bus arrangement is called mappable bus. For a mappable bus, the address range of a child bus may be dynamically mapped to the address range of its parent bus during run time. In order to perform dynamic address mapping, the bus manager provides the HRM the service to map its bus addresses within the parent bus range. Further, the HRM checks to ensure the requested resource is available in the bus address, find a free range in its parent bus address that its bus address can be mapped into, and call the bus manager to map the requested resource to the free range in its parent bus address range. The HRM repeats this process until the addresses are mapped to the system physical address. Taking the configuration under FIG. 1 as an example, in order to resolve a specific device I/O port address, the HRM first determines if the address is free in the ISA bus address, then translates resource to the PCI bus address range, and finally translates the address to the system bus.

Figure 4:
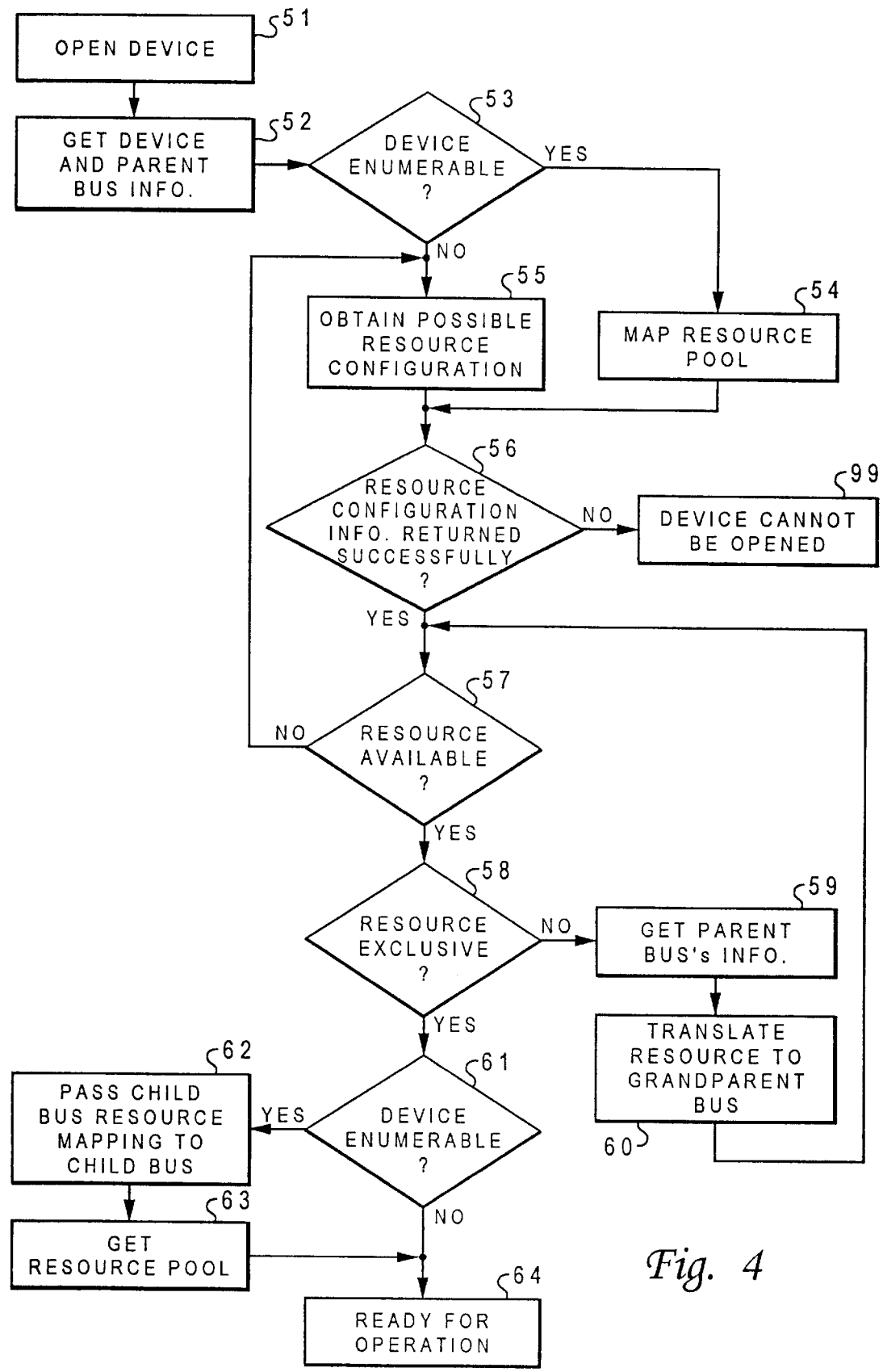
FIG. 4 is a high-level logic flow diagram of a method for dynamically translating a bus address within a computer system, according to a preferred embodiment of the present invention.

Referring now to FIG. 4, there is illustrated a high-level logic flow diagram of a method for dynamically translating a bus address within a computer system, according to a preferred embodiment of the present invention. This bus address translation occurs when a hardware device is being accessed for the first time either by an operating system or by an application software. An open device is requested for the first time, as shown in block 51. Information about this device and its parent bus are then obtained by the HRM from the Hardware Namespace, as illustrated in block 52. Device information may indicate resource such as I/O port address, IRQ address, DMA address, I/O memory address, etc. A determination is made as to whether or not the device is enumerable, as depicted in block 53. An enumerable device is a bus bridge while a non-enumerable device is a hardware device. If the device is enumerable, the HRM utilizes an interface provided by the Bus Manager to map a bus resource pool of the child bus to a parent bus, as shown in block 54. There may be several possible ranges in the parent bus bridge that the child bus bridge can be enabled to decode. Given this information from the parent bus, the HRM can determine the conflict free range to map the child bus to the parent bus. The bus resource pool describes all the address ranges to the parent bus that are available for the child device to utilize.

However, if the device is not enumerable, the HRM utilized another interface provided by the Bus Manager to get a possible resource configuration of the device from the parent bus, as shown in block 55. The resource configuration contains information such as IRQ address or I/O port address in which the hardware device can be accessed. The bus resource pool and the resource configuration are collectively referred to as the RESOURCE information from here on. A determination is made by the HRM as to whether or not the RESOURCE information is returned from the parent bus manager successfully, as shown in block 56. If the HRM has received all the RESOURCE information and none of them can be configured in this system successfully, then the HRM cannot configure the device to a conflict-free resource configuration and the device cannot be opened or accessed, as depicted in block 99. Such information is related back to the HRM for subsequent handling of the situation. This may include sending a message a user to inform him/her of the situation or adjusting the resource demand of the device if such is possible.

However, if there are resource configurations available in the Parent bus resource pool, a determination is made by the HRM as to whether the RESOURCE information is available in the parent bus resource pool, as depicted in block 57. If the RESOURCE information is not available from the parent bus resource pool, the process returns to block 55 in order to obtain a next set of resource configuration.

If the RESOURCE information is available from the parent bus resource pool, a determination is made by the HRM as to whether or not the bus resource pool is exclusively allocated to the parent bus, as depicted in block 58. The resource pool is exclusive to a bus when the bus resource pool is not shared by another sibling device. As mentioned previously, this device can be a bus or a hardware device attached to a bus. If the bus resource pool is not exclusively allocated to the parent bus, the HRM will obtain the grandparent bus resource pool in the Hardware Namespace, as depicted in block 59. The HRM then utilizes the interface provided by the Bus Manager to translate the RESOURCE information in the parent bus to the equivalent resource mapped into the bus resource pool of the grandparent bus, as illustrated in block 60. After the RESOURCE information is translated by the grandparent bus, the HRM returns to block 57.

Otherwise, if the bus resource pool is exclusively allocated to the parent bus, the RESOURCE information allocated from the parent bus resource pool. A determination is again made as to whether or not the device is enumerable, as shown in block 61. If the device is not enumerable, the device is ready for operation at this point, as depicted in block 64. Otherwise, if the device is enumerable, the mapping of the child bus resource pool is enable and passed to the child bus, as illustrated in block 62. A bus resource pool that will be utilized to configure the device off the child bus is obtained, as shown in block 63, and the bus is ready for operation, as depicted in block 64.

Under the present invention, when a hot-pluggable device is installed in a computer system during runtime, a conflict-free resource can be dynamically allocated to the hot-pluggable device. This is accomplished by invoking the method as depicted in FIG. 4 once the presence of the hot-pluggable is detected by the computer system.

As has been described, the present invention provides an improved method for dynamically translating bus address within a computer system. Under the present invention, the bus address is not restricted to mapping that is statically configured by the system BIOS before loading the operating system. Thus, the system resource can be allocated more efficiently during runtime.

Aspects of the present invention pertaining to specific "method functions" is implementable on computer systems. In an alternate embodiment, the present invention may be implemented as a computer program product for usage with a computer system. Those skilled in the art should readily appreciate that programs defining the functions of the present invention can be delivered to a computer system in many forms, which include but are not limited to: (a) information permanently stored on non-writable storage media (e.g., read only memory devices such as ROM or CD-ROM disks readable by a computer I/O attachment); (b) information alterably stored on writable storage media (e.g., floppy disks and hard drives); or (c) information conveyed to a computer through communication media, such as networks. It should be understood, therefore, that such media, when carrying computer-readable instructions that direct the method functions of the present invention, represent alternate embodiments of the present invention.

While the invention has been particularly shown and described with reference to a preferred embodiment, it will be understood by those skilled in the art that various changes in form and detail may be made therein without departing from the spirit and scope of the invention.

What is claimed is:

1. A method for dynamically translating a bus address within a computer system having a plurality of buses connected in a hierarchial configuration, said method comprising the steps of:

storing information concerning said plurality of buses and any device attached to each of said plurality of buses in a Hardware Namespace;

in response to a request for access to a device attached to one of said plurality of buses for a first time, determining whether or not there is a resource from said Hardware Namespace available for said device in a parent bus of said device;

in response to a determination that a resource is available in a parent bus for said device, determining whether or not said resource is exclusively allocated in said parent bus for said device;

in response to a determination that no resource is available in a parent bus for said device, indicating said device is not configurable;

in response to a determination that said resource is exclusively allocated in said parent bus for said device, configuring said device according to said available resource; and in response to a determination that said resource is not exclusively allocated in said parent bus for said device, searching through said plurality of buses until a bus having a resource that can be allocated for said device is found such that said device can be added to any one of said plurality of buses within said computer system independent of bus technology.

2. The method according to claim 1, wherein said storing step further includes a step of storing said information in said Hardware Namespace in a hierarchial configuration.

3. The method according to claim 1, wherein said step of determining whether or not there is resource available in a parent bus of said device for said device further includes a step of determining whether or not there is resource available in a parent bus of said device for said device in a resource pool of said parent bus of said device in said Hardware Namespace.

4. A computer system having a plurality of buses connected in a hierarchial configuration, said computer system comprising:

means for storing information concerning said plurality of buses and any device attached to each of said plurality of buses in a Hardware Namespace;

means for determining whether or not there is resource from said Hardware Namespace available for said device in a parent bus of said device, in response to a request for an access to a device attached to one of said plurality of buses for a first time;

means for determining whether or not said resource is exclusively allocated in said parent bus for said device, in response to a determination that there is resource available in a parent bus for said device;

means for indicating said device is not configurable, in response to a determination that no resource is available in a parent bus for said device;

means for configuring said device according to said available resource, in response to a determination that said resource is exclusively allocated in said parent bus for said device; and means for searching through said plurality of buses until a bus having a resource that can be allocated for said device is found, in response to a determination that said resource is not exclusively allocated in said parent bus for said device.

5. The computer system according to claim 4, wherein said computer system further includes a means for storing information in said Hardware Namespace in a hierarchial configuration.

6. The computer system according to claim 4, wherein said resource information is stored in a resource pool of said Hardware Namespace.

7. The computer system according to claim 4, wherein said device can be a bus bridge or a hardware device.

8. A computer program product residing on a computer usable medium for dynamically translating bus address within a computer system having a plurality of buses connected in a hierarchial configuration, said computer product comprising:

program code means for storing information concerning said plurality of buses and any device attached to each of said plurality of buses in a Hardware Namespace;

program code means for determining whether or not there is resource from said Hardware Namespace available for said device in a parent bus of said device, in response to a request for an access to a device attached to one of said plurality of buses for a first time;

program code means for determining whether or not said resource is exclusively allocated in said parent bus for said device, in response to a determination that there is resource available in a parent bus for said device;

program code means for indicating said device is not configurable, in response to a determination that no resource is available in a parent bus for said device;

program code means for configuring said device according to said available resource, in response to a determination that said resource is exclusively allocated in said parent bus for said device; and program code means for searching through said plurality of buses until a bus having a resource that can be allocated for said device is found, in response to a determination that said resource is not exclusively allocated in said parent bus for said device.

9. The computer program product according to claim 8, wherein said computer program product further includes a program code means for storing information in said Hardware Namespace in a hierarchial configuration.

\* \* \* \* \*